United States Patent [19]
Taylor

[11] 3,809,799
[45] May 7, 1974

[54] ELECTRICAL WIRING DUCT WITH MOUNTING CLIP

[75] Inventor: Philip W. Taylor, Howell, Mich.

[73] Assignee: Taylor Industries, Inc., Howell, Mich.

[22] Filed: Sept. 28, 1972

[21] Appl. No.: 293,048

[52] U.S. Cl............. 174/68 C, 24/255 R, 138/106, 174/72 A, 248/205 A, 248/223, 248/310, 248/316 D
[51] Int. Cl.............................................. H02g 3/26
[58] Field of Search.......... 174/40 CC, 68 C, 72 A, 174/95, 97, 101; 24/255 R, 257 R, 259 R, 259 C; 138/106, 107; 248/73, 205 A, 309, 310, 316 D, 223, 224, 225; 317/122

[56] References Cited
UNITED STATES PATENTS

| | | | |
|---|---|---|---|
| 2,921,607 | 1/1960 | Caveney | 174/72 A X |
| 3,055,971 | 9/1962 | Lander | 174/72 A |
| 3,126,444 | 3/1964 | Taylor | 174/101 |
| 3,156,765 | 11/1964 | Weiss | 174/72 A X |

FOREIGN PATENTS OR APPLICATIONS

| | | | |
|---|---|---|---|
| 1,078,193 | 8/1967 | Great Britain | 24/257 R |
| 483,138 | 1/1970 | Switzerland | 174/72 A |

OTHER PUBLICATIONS
Panduit Wiring Components, Bulletin L2-11, April 1, 1961.

*Primary Examiner*—Laramie E. Askin

[57] ABSTRACT

A U-shaped electrical wiring duct with a base and generally parallel side walls is provided with grooves on the exterior of the side walls near the base. A clip, secured to a wall, comprises a bar portion, spaced tab members extending outwardly from the bar portion, and flanges extending one from each of said tab members respectively. The flanges are adapted to snap into the grooves on the wiring duct and thus grip the base of the duct. The tab members are each spaced from an end of the bar portion to define a projection at each end thereof.

6 Claims, 3 Drawing Figures

PATENTED MAY 7 1974 3,809,799

ELECTRICAL WIRING DUCT WITH MOUNTING CLIP

FIELD OF THE INVENTION

It is a common practice in the field of electrical wiring to use a duct to accommodate a bundle of wires therein. Such ducts usually take the form of an elongated, generally U-shaped channel having a base and generally parallel side walls. The use of such a duct, although very convenient and protective of the wires enclosed therein, represents an added cost to the transmission of electricity. Therefore, workers in the art, while active in seeking new improvements, have been very cost conscious. An example of the latter is the now common step of stamping out portions of the side walls in a manner to effect the saving of a maximum quantity of material.

A related problem which has persisted until the advent of the invention described herein involves the securing, or fastening, of the duct to a wall, such as a rear or side panel of an electrical wiring cabinet. One solution which has been suggested is the use of a clip in the form of an elongated strip, substantially as long as the duct itself, which is attached to a wall and grips a portion of the duct. For example, U.S. Pat. No. 3,156,765 (Weiss) and British Patent 972,773 (Mills) disclose this type of clip.

A second type of solution to the fastening problem, and one which leads to the saving of material, is disclosed, for example, in U.S. Pat. No. 3,229,029 (Weiss) wherein a clip in the form of a relatively narrow bar is positioned across the inside of the base of the duct. The base is secured by being positioned between the clip and the wall. This type of clip has a severe disadvantage in that it must be positioned after the duct is in place and requires the positioning and the turning of a screw within the narrow confines of the duct.

A third type of solution to the fastening problem is disclosed, for example, in U.S. Pat. No. 2,921,607 (Caveney) wherein the clip attached to the wall is metallic and generally U-shaped with relatively long side arms to resiliently press against the side walls of the duct. This type of clip, although effecting some saving of material, has a tendency to lose its resiliency and thus permit a loosening of grip on the duct, and it may cause electrical shorting or grounding of some of the conductors in the duct if the isulation of the conductors is damaged and the clip is brought in contact with the bare conductors.

It is, therefore, an object of this invention to provide a clip by which an electrical wiring duct can be secured to a wall in an effective manner and with a substantial saving in material of construction.

SUMMARY OF THE INVENTION

The clip of the invention comprises a relatively narrow non-conductive bar; a pair of integral spaced tab members extending outwardly from said bar; and integral flanges extending inwardly, one from each of said tab members, respectively. The flanges are adapted to grip the duct by resiliently snapping into grooves, one on the exterior of each side wall, respectively, of said duct. The grooves are near and parallel to the base of the duct.

By a "relatively narrow" bar is meant one generally rectangular in shape, which is relatively narrow compared to the length of the duct. For example, a typical clip can be about ⅞ inch wide. A significant economy is achieved by the invention in that the grooves in the side walls of the duct can be made during the extruding of the duct with no significant increase in cost.

DESCRIPTION OF THE PREFERRED EMBODIMENT

Figure 1:
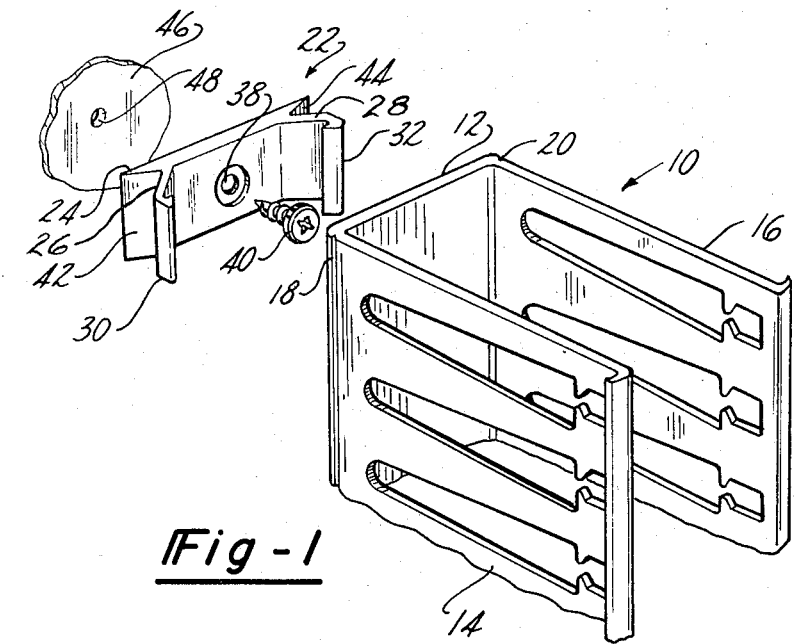
FIG. 1 is an exploded, perspective view of the electrical wiring duct assembly of the invention.
Figure 2:
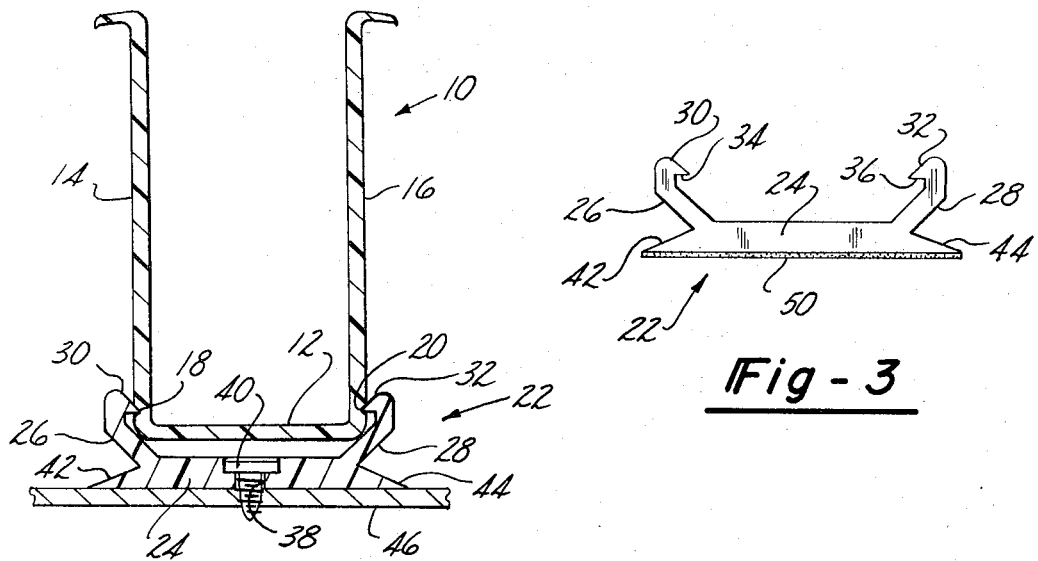
FIG. 2 is a sectional view of the structure of FIG. 1 in its assembled form.

A generally U-shaped wiring duct, indicated generally at 10, is provided with a base 12 and generally parallel side walls 14, 16. Grooves 18, 20 on the outside of side walls 14, 16, respectively, are near, and parallel to, the base 12.

A clip, indicated generally at 22, comprises a substantially flat bar portion 24, integral spaced tab members 26, 28, and integral flanges 30, 32 extending inwardly from the tab members 26, 28 respectively to form shoulders 34, 36, respectively. A hole 38, adapted to receive a sheet metal screw 40, a rivet or other fastener is in the flat portion 24 of clip 22. Tab members 26, 28 are spaced from their respective ends of the bar portion 24 to define projections 42, 44 respectively.

Figure 3:
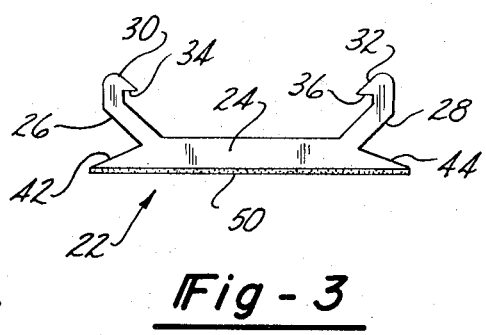
FIG. 3 is a side elevation view of an alternative embodiment of the clip of the invention.

A wall 46 as, for example, the wall of a control cabinet, is provided with a hole 48 adapted to receive the screw 40 in a manner to secure the clip 22 to the wall 46. Alternatively, the clip 22 can be attached to the wall 46 by a suitable adhesive, as illustrated at 50 in FIG. 3. When an adhesive, such as at 50, is used, it can be used alone, or a corresponding and coacting adhesive surface can be applied to the cabinet wall 46 for mutual adhesion. Adhesives can be used in other ways. For example, pressure sensitive, double-sided, adhesive tapes can be applied to the clip or to both the clip and wall. Also combinations of adhesives and fasteners, such as screws, can be used.

In operation the clip 22 is secured to the wall 46 by passing the sheet metal screw 40 through the hole 38 in the bar portion 24 and screwing it through the hole 48 in the wall 46. The bottom of the base 12 of the wiring duct 10 is then positioned in the space between the flanges 30, 32 and against the tapered upper sides of the flanges. The duct 10 is then pushed sharply inwardly toward the wall 46 which effects a snapping of the flanges 30, 32 into the grooves 18, 20 respectively, the shoulders 34, 36 engaging the walls of the respective grooves 18, 20.

The clip 22 can be made from any suitably strong material with sufficient resilience to permit the spreading apart of the tab members 26, 28 during the process of snapping the base 12 of the duct 10 into place. However, molded thermoplastic materials are preferred for their resilience, strength and electrical insulation values. Although, as stated, resilience of the material is desirable, it has also proved desirable to insure against breakage of a tab member at the point where it joins the bar portion. A clip is particularly vulnerable to breakage in those structures where the stress line of bending is at the edge of the bar portion. In the present invention, however, the stress is minimized by the presence of the projections 42, 44. Because of the latter the thickness of the bar portion immediately below the tab member 26, 28 is maintained and, even more important, any tendency toward excessive bending at the base of the tabs is prevented. Such tendency can result from placing the duct unevenly an pushing unduly hard against one tab. As bending of a tab increases, the pressure of the projection against the wall increases to resist excessive bending.

It will be apparent to one skilled in the art to which the invention pertains that various changes and modifications may be made therein without departing from the spirit of the invention or the scope of the appended claims.

I claim:

1. An electrical wiring duct assembly adapted to be attached to a wall, said assembly comprising:
   a. a generally U-shaped electrical wiring duct having a base and generally parallel side walls;
   b. a groove on the exterior of each said side wall, each said groove extending longitudinally parallel to and near said base; and
   c. a clip adapted to be secured to said wall and comprising:
      1. a substantially flat bar portion having a bottom planar surface for engagement with said wall;
      2. a pair of spaced apart symmetrically disposed integral tab members extending from the top surface of said bar portion each at a position remote from the end of said bar portion; and
      3. an integral flange extending inwardly from each said tab member, said flange having an upper tapered surface for facilitating engagement of said duct between said tab members and being snapped in one of said grooves to grip said duct between said tab members.

2. The assembly according to claim 1 wherein said bar portion is provided with a hole therethrough, said hole being adapted to receive a fastening means for securing said clip to said wall.

3. The assembly according to claim 1 wherein a surface of said clip is provided with an adhesive layer for securing said clip to said wall.

4. The assembly according to claim 1 wherein said clip is made from a resilient, electrically nonconducting thermoplastic material and wherein said bar portion is provided with a hole therethrough, said hole being adapted to receive a screw for fastening said clip to said wall.

5. The assembly according to claim 4 wherein said bar portion is provided with an adhesive on the bottom surface thereof.

6. The assembly according to claim 1 wherein said tab members extend from the top surface of said bar member at a diverging angle one relative to the other.

* * * * *

UNITED STATES PATENT OFFICE
CERTIFICATE OF CORRECTION

Patent No. 3,809,799          Dated May 7, 1974

Inventor(s) Philip W. Taylor

It is certified that error appears in the above-identified patent and that said Letters Patent are hereby corrected as shown below:

Column 1, line 48, change "isulation" to

--insulation--.

Column 3, line 6, after "evenly" change "an" to

--and--.

Signed and sealed this 1st day of October 1974.

(SEAL)
Attest:

McCOY M. GIBSON JR.          C. MARSHALL DANN
Attesting Officer          Commissioner of Patents